United States Patent
Howard et al.

(10) Patent No.: US 10,225,341 B2
(45) Date of Patent: Mar. 5, 2019

(54) IMPLEMENTING SYNCHRONIZATION OF STATE INFORMATION BETWEEN INSTANCES OF AN APPLICATION AS WELL AS BETWEEN DIFFERENT APPLICATIONS IN AN EFFICIENT, SCALABLE MANNER

(71) Applicant: International Business Machines Corporation, Armonk, NY (US)

(72) Inventors: Curtiss J. Howard, Cary, NC (US); Todd E. Kaplinger, Raleigh, NC (US); William A. Nagy, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/961,732

(22) Filed: Apr. 24, 2018

(65) Prior Publication Data
US 2018/0248946 A1    Aug. 30, 2018

Related U.S. Application Data

(63) Continuation of application No. 13/904,248, filed on May 29, 2013, now Pat. No. 10,057,343, which is a
(Continued)

(51) Int. Cl.
*G06F 15/16*    (2006.01)
*H04L 29/08*    (2006.01)
(Continued)

(52) U.S. Cl.
CPC ...... *H04L 67/1095* (2013.01); *G06F 11/2097* (2013.01); *G06F 12/0802* (2013.01); *G06F 11/2038* (2013.01)

(58) Field of Classification Search
CPC ............ H04L 67/1095; G06F 11/2097; G06F 12/0802; G06F 11/2038
(Continued)

(56) References Cited

U.S. PATENT DOCUMENTS

| | | |
|---|---|---|
| 6,049,838 A | 4/2000 | Miller et al. |
| 6,594,671 B1 | 7/2003 | Aman et al. |

(Continued)

FOREIGN PATENT DOCUMENTS

WO    2007128687 A1    11/2007

OTHER PUBLICATIONS

Bolosky, W.J., et al., "Paxos Replicated State Machines as the Basis of a High-performance Data Store," http://static.usenix.org/events/nsdi11/tech/full_papers/Bolosky.pdf, Feb. 18, 2012.
(Continued)

*Primary Examiner* — Melvin H Pollack
(74) *Attorney, Agent, or Firm* — Robert A. Voigt, Jr.; Winstead, P.C.

(57) ABSTRACT

A method, system and computer program product for implementing synchronization of state information in an efficient, scalable manner. A shared state server receives a request from a client device to access a scope containing state information. The scope is distributed over a partition(s) via the use of a "data grid" thereby increasing scalability. The shared state server relays the request to a data grid server responsible for maintaining the data grid comprised of an in-memory cache and partitions outside of the in-memory cache. The request includes a key associated with a value corresponding to the requested state information. The data grid server obtains the value associated with the key from its data grid and sends it to the shared state server to be relayed to the requesting client device. In this manner, the state information is stored in a scalable manner thereby improving the efficiency in synchronizing state information.

5 Claims, 5 Drawing Sheets

Related U.S. Application Data continuation of application No. 13/903,174, filed on May 28, 2013, now Pat. No. 10,044,799.

(51) Int. Cl.
  *G06F 12/0802* (2016.01)
  *G06F 11/20* (2006.01)

(58) Field of Classification Search
  USPC .......................................................... 709/203
  See application file for complete search history.

(56) References Cited

U.S. PATENT DOCUMENTS

| | | | |
|---|---|---|---|
| 7,788,346 B2* | 8/2010 | Kumar | G06F 11/1464 707/624 |
| 7,899,917 B2 | 3/2011 | Chitre et al. | |
| 7,900,203 B2 | 3/2011 | Ozzie et al. | |
| 8,103,797 B2 | 1/2012 | Day | |
| 8,386,540 B1 | 2/2013 | McAlister et al. | |
| 8,463,884 B2 | 6/2013 | Clinton et al. | |
| 8,484,716 B1 | 7/2013 | Hodgson et al. | |
| 8,539,567 B1 | 9/2013 | Logue et al. | |
| 8,613,070 B1 | 12/2013 | Borzycki et al. | |
| 8,621,091 B1* | 12/2013 | Akalin | G06F 17/30283 709/220 |
| 8,631,066 B2* | 1/2014 | Lim | G06F 9/5077 709/203 |
| 8,635,373 B1 | 1/2014 | Supramaniam et al. | |
| 8,666,933 B2 | 3/2014 | Pizzomi et al. | |
| 8,666,938 B1* | 3/2014 | Pancholy | G06F 9/455 707/610 |
| 8,682,916 B2 | 3/2014 | Wong et al. | |
| 8,769,127 B2 | 7/2014 | Selimis et al. | |
| 8,806,570 B2 | 8/2014 | Barton et al. | |
| 8,812,856 B2* | 8/2014 | Tamma | G07F 17/3241 713/176 |
| 8,832,712 B2 | 9/2014 | Houston et al. | |
| 8,843,599 B2 | 9/2014 | Pope et al. | |
| 8,880,588 B2 | 11/2014 | Prasad | |
| 8,893,147 B2* | 11/2014 | Yin | G06F 9/45558 718/105 |
| 8,954,611 B2* | 2/2015 | Chan | A63F 13/12 709/203 |
| 8,966,438 B2 | 2/2015 | Chamberlain | |
| 8,983,983 B2* | 3/2015 | Antonysamy | G06F 17/30179 706/12 |
| 9,003,299 B2* | 4/2015 | Freedman | H01B 7/292 715/745 |
| 9,008,088 B2* | 4/2015 | Ashwood-Smith | H04L 12/462 370/390 |
| 9,027,098 B2 | 5/2015 | Legacy | |
| 9,032,248 B1 | 5/2015 | Petty et al. | |
| 9,037,714 B2 | 5/2015 | Belchee et al. | |
| 9,043,458 B2* | 5/2015 | Balaji | H04L 43/04 709/217 |
| 9,043,706 B2* | 5/2015 | Nancke-Krogh | G06F 9/4843 709/231 |
| 9,063,756 B2* | 6/2015 | Ben-Shaul | G06F 9/4451 |
| 9,071,627 B2 | 6/2015 | Buck | |
| 9,116,862 B1 | 8/2015 | Rath et al. | |
| 9,146,822 B2 | 9/2015 | Patankar et al. | |
| 9,170,812 B2 | 10/2015 | Vorbach et al. | |
| 9,262,435 B2* | 2/2016 | Vibhor | H04L 29/0854 |
| 9,331,937 B2* | 5/2016 | Koponen | H04L 45/64 |
| 9,338,677 B2* | 5/2016 | Hederstierna | H04W 76/11 |
| 9,361,122 B2 | 6/2016 | Chen et al. | |
| 9,396,245 B2 | 7/2016 | Mackenzie et al. | |
| 9,438,697 B2* | 9/2016 | Teng | H04L 67/42 |
| 9,443,230 B2* | 9/2016 | Pratt | H04L 51/38 |
| 9,514,014 B2 | 12/2016 | Webman et al. | |
| 9,519,490 B2 | 12/2016 | Vanturennout et al. | |
| 9,542,231 B2 | 1/2017 | Khan et al. | |
| 9,563,413 B2 | 2/2017 | Chan et al. | |
| 9,600,552 B2 | 3/2017 | Quan et al. | |
| 9,632,828 B1 | 4/2017 | Mehta et al. | |
| 9,633,098 B2 | 4/2017 | Aissi et al. | |
| 9,641,599 B2* | 5/2017 | Wesley | H04L 67/10 |
| 9,647,917 B2* | 5/2017 | Hasha | H04L 67/1095 |
| 9,674,731 B2 | 6/2017 | Raleigh et al. | |
| 9,690,836 B2 | 6/2017 | Johnsen et al. | |
| 9,721,246 B2* | 8/2017 | Ho | G06F 17/30578 |
| 9,729,631 B2* | 8/2017 | Addala | G06F 17/3089 |
| 9,740,761 B2 | 8/2017 | Adoc, Jr. et al. | |
| 9,753,754 B2* | 9/2017 | Howell | G06F 11/1484 |
| 9,800,608 B2 | 10/2017 | Korsunsky et al. | |
| 9,838,240 B1* | 12/2017 | Cormie | G06F 17/30094 |
| 9,854,063 B2 | 12/2017 | Borzycki et al. | |
| 9,875,149 B2 | 1/2018 | McDevitt et al. | |
| 9,888,068 B2 | 2/2018 | Kamath et al. | |
| 9,937,414 B2 | 4/2018 | Mahajan et al. | |
| 2002/0198883 A1 | 12/2002 | Nishizawa et al. | |
| 2006/0085594 A1 | 4/2006 | Roberson et al. | |
| 2006/0190468 A1 | 8/2006 | Mihaila et al. | |
| 2007/0101326 A1 | 5/2007 | Cai et al. | |
| 2007/0203943 A1 | 8/2007 | Adlung et al. | |
| 2008/0320244 A1 | 12/2008 | Shen et al. | |
| 2009/0112779 A1 | 4/2009 | Wolf et al. | |
| 2009/0172101 A1 | 7/2009 | Arthursson | |
| 2010/0030995 A1 | 2/2010 | Wang et al. | |
| 2010/0262958 A1 | 10/2010 | Clinton et al. | |
| 2010/0275260 A1 | 10/2010 | Bergheaud et al. | |
| 2011/0055827 A1 | 3/2011 | Lin et al. | |
| 2011/0078274 A1 | 3/2011 | Joachimpillai et al. | |
| 2011/0270855 A1 | 11/2011 | Antonysamy | |
| 2012/0109926 A1 | 5/2012 | Novik et al. | |
| 2012/0137210 A1 | 5/2012 | Dillon | |
| 2012/0185500 A1 | 7/2012 | Bhogal et al. | |
| 2012/0254175 A1 | 10/2012 | Horowitz et al. | |
| 2012/0254289 A1 | 10/2012 | Sathish | |
| 2012/0278344 A1 | 11/2012 | Berg et al. | |
| 2013/0047165 A1 | 2/2013 | Goetz et al. | |
| 2013/0066832 A1* | 3/2013 | Sheehan | G06Q 10/00 707/634 |
| 2013/0212340 A1 | 8/2013 | Berg et al. | |
| 2013/0318158 A1 | 11/2013 | Teng et al. | |
| 2014/0032875 A1 | 1/2014 | Butler | |
| 2014/0068328 A1 | 3/2014 | Jain et al. | |
| 2014/0095625 A1 | 4/2014 | Quan et al. | |
| 2014/0199979 A1 | 7/2014 | Singhai et al. | |
| 2014/0244721 A1 | 8/2014 | Taine et al. | |
| 2014/0258703 A1* | 9/2014 | Vanturennout | G06F 9/4406 713/100 |
| 2014/0280499 A1 | 9/2014 | Basavaiah et al. | |
| 2014/0287836 A1 | 9/2014 | Chan et al. | |
| 2014/0289411 A1 | 9/2014 | Bornstein et al. | |
| 2014/0304409 A1 | 10/2014 | Kamath et al. | |
| 2014/0334369 A1 | 11/2014 | Kaikkonen et al. | |
| 2014/0358988 A1 | 12/2014 | Howard et al. | |
| 2014/0359071 A1 | 12/2014 | Howard et al. | |
| 2016/0218939 A1 | 7/2016 | Tiwari | |
| 2016/0299960 A1 | 10/2016 | Chene et al. | |
| 2017/0054790 A1* | 2/2017 | McCubbin | H04L 69/04 |
| 2017/0063968 A1 | 3/2017 | Kitchen et al. | |
| 2017/0097974 A1* | 4/2017 | Adoc, Jr. | G06Q 30/0641 |
| 2017/0177694 A1 | 6/2017 | Aissi et al. | |

OTHER PUBLICATIONS

Anonymous, "Efficient Run-time Scoped Memory Assignment Rules Checking," http://priorartdatabase.com/IPCOM/000210483, Sep. 6, 2011.

IBM, "A Mechanism for Defining Dynamic Event Sequencing Scope," http://www.ip.com/pubview/IPCOM000167189D, Feb. 2, 2008.

Wang et al.; "A Scalable Queuing Service Based on an In-Memory Data Grid," Proceedings 2010 IEEE 7th International Conference on e-Business Engineering (ICEBE 2010), pp. 236-243, 2010.

(56) References Cited

OTHER PUBLICATIONS

Office Action for U.S. Appl. No. 15/793,488 dated Nov. 29, 2018, pp. 1-35.

* cited by examiner

IMPLEMENTING SYNCHRONIZATION OF STATE INFORMATION BETWEEN INSTANCES OF AN APPLICATION AS WELL AS BETWEEN DIFFERENT APPLICATIONS IN AN EFFICIENT, SCALABLE MANNER

TECHNICAL FIELD

The present invention relates generally to state synchronization, and more particularly to implementing synchronization of state information between instances of an application as well as between different applications in an efficient, scalable manner.

BACKGROUND

Today, users may often use multiple computing devices, such as mobile computing devices and desktop computing devices. In addition, such users may utilize multiple instances of an application on these computing devices. For example, instances of an e-mail application may be loaded onto a laptop computer, a smartphone and a desktop computer. In this way, the user may have access to the same application and/or application data on multiple devices. For instance, the user may check an e-mail account on the user's desktop computer at home and then later check the e-mail account on the user's smartphone while running errands.

As a result of having multiple instances of an application on multiple devices, the application state, such as application settings, for each of the instances of the application needs to be synchronized in order for the user to be provided with a seamless and consistent experience. That is, the application state, such as application settings, for each of the instances of the application needs to be synchronized in order for each application to perform consistently regardless of which device the user is using. For example, if the user configures a new e-mail account within an e-mail application on a laptop computer, then the new e-mail account should be reflected within the e-mail application on the user's desktop computer. As a result, the application state for each of the instances of the application needs to be synchronized.

Currently, such instances of an application become synchronized by creating an interface with a remote service (e.g., web services, such as JAX-RS services) and have those instances periodically synchronize in order to maintain consistency. Unfortunately, such a synchronization process occurs at unpredictable times. Furthermore, such a synchronization process may have unpredictable results depending on which application instance is synchronized first.

SUMMARY

In one embodiment of the present invention, a method for implementing synchronization of state information in an efficient, scalable manner comprises receiving from a client device an update to state information of an application stored in a scope, where the scope is distributed over one or more partitions. The method further comprises determining whether other instances of the application whose state information was updated is being used by other client devices with access to the scope. The method additionally comprises notifying a first set of one or more client devices with access to the scope regarding the update to the state information of the application in response to determining that one or more other instances of the application are being used by the first set of one or more client devices.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which.

DETAILED DESCRIPTION

The present invention comprises a method, system and computer program product for implementing synchronization of state information in an efficient, scalable manner. In one embodiment of the present invention, a shared state server receives a request from a client device to access a shared state scope containing state information. The shared state scope is distributed over one or more partitions via the use of a "data grid" thereby increasing scalability. The request received from the client device is relayed to a server, referred to herein as the "data grid server," by the shared state server, where the data grid server is responsible for maintaining the data grid comprised of an in-memory cache and partitions outside of the in-memory cache. The request may include a key associated with a value corresponding to the requested state information. A determination is made by the data grid server using a routing table as to whether the requested state information is stored in the in-memory cache of the data grid server. The routing table includes a listing of keys and associated containers of the in-memory cache or associated partitions outside of the in-memory cache storing the values associated with the keys. If the requested state information is not stored in the in-memory cache (i.e., a cache miss), then the data grid server identifies the partition outside of the in-memory cache, such as in a separate physical machine, storing the value associated the key. The data grid server then obtains the value from the identified partition and sends the obtained value to the shared state server to be relayed to the requesting client device. In this manner, the state information can be stored in a scalable manner thereby improving the efficiency in synchronizing state information.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
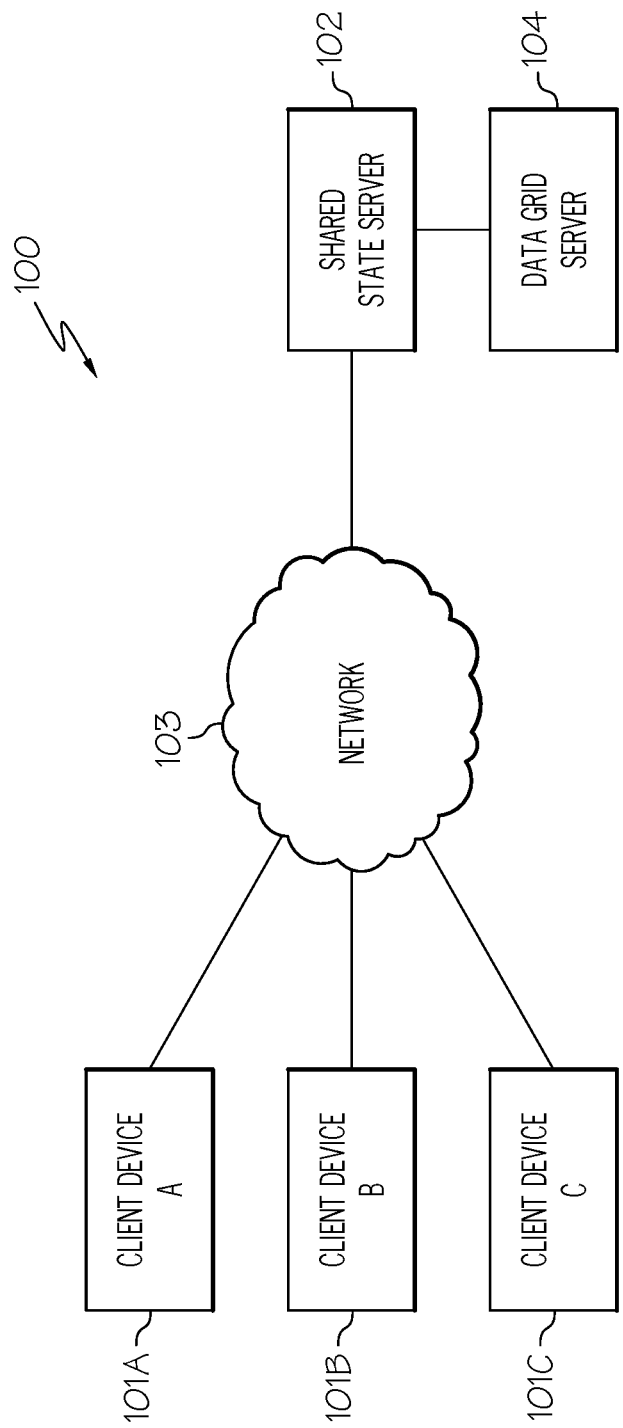
FIG. 1 illustrates a network system configured in accordance with an embodiment of the present invention.

Referring now to the Figures in detail, FIG. 1 illustrates a network system 100 for practicing the principles of the present invention in accordance with an embodiment of the present invention. Network system 100 includes client devices 101A-101C (identified as "Client Device A," "Client Device B," and "Client Device C," respectively, in FIG. 1) connected to a server (referred to herein as the "shared state server") 102 via a network 103. Client devices 101A-101C may collectively or individually be referred to as client devices 101 or client device 101, respectively. Client device 101 may be any type of computing device (e.g., portable computing unit, Personal Digital Assistant (PDA), smartphone, laptop computer, mobile phone, navigation device, game console, desktop computer system, workstation, Internet appliance and the like) configured with the capability of connecting to network 103 and consequently communicating with other client devices 101 and shared state server 102. Client devices 101 and shared state server 102 may communicate with each other using any protocol, including, but not limited to, client devices 101 using a Representational State Transfer (REST) service to communicate with shared state server 102 and shared state server 102 using a push channel to communicate with clients 101.

FIG. 1 further illustrates a server, referred to herein as the "data grid" server 104, connected to shared state server 102. In one embodiment, the state information (e.g., application settings) is stored in multiple partitions or "shared state scopes" (also referred to as simply "scopes"). In one embodiment, each shared state scope is distributed over one or more partitions via the use of a "data grid," maintained by data grid server 104, thereby improving the scalability and availability of the state information as discussed in greater detail below in connection with FIG. 3. As will be discussed in further detail below, client devices 101 may issue a request to shared state server 102 to access state information stored in a scope. Such a request will be relayed to data grid server 104 to access the requested state information in its "data grid" comprised of an in-memory cache and partitions outside of the in-memory cache. A description of the hardware configuration of data grid server 104 is provided further below in connection with FIG. 2.

In one embodiment, shared state server 102 is configured to synchronize the state information in an efficient, scalable manner using the data grid as discussed in further detail below. The state information (e.g., user-wide state information, device-wide state information, application-specific state information) stored within the state scope can be shared among the multiple instances of an application residing on multiple client devices 101. For example, the state information in a shared state scope can be shared among an instance of an application on a laptop computer and an instance of the application on a desktop computer. Furthermore, the state information may include common information (e.g., user information) that is shared among different applications. For example, common user information may be shared among multiple different applications thereby negating the requirement of each application maintaining a separate copy of common user information. In this manner, the state information of an application having multiple instances on multiple client devices 101 can be synchronized among these client devices 101 (e.g., between a mobile computing device and a desktop computing device) without requiring periodic synchronization as discussed further below. Furthermore, in this manner, the state information containing common information used by different applications can be synchronized among these applications without requiring periodic synchronization as discussed further below. A description of the hardware configuration of shared state server 102 is provided further below in connection with FIG. 2.

Network 103 may be, for example, a local area network, a wide area network, a wireless wide area network, a circuit-switched telephone network, a Global System for Mobile Communications (GSM) network, Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

While FIG. 1 illustrates three clients 101A-101C, a single shared state server 102 and a single data grid server 104, network system 100 may include any number of clients 101, shared state servers 102 and data grid servers 104. The embodiments of network system 100 are not to be limited in scope to the depiction of FIG. 1.

Figure 2:
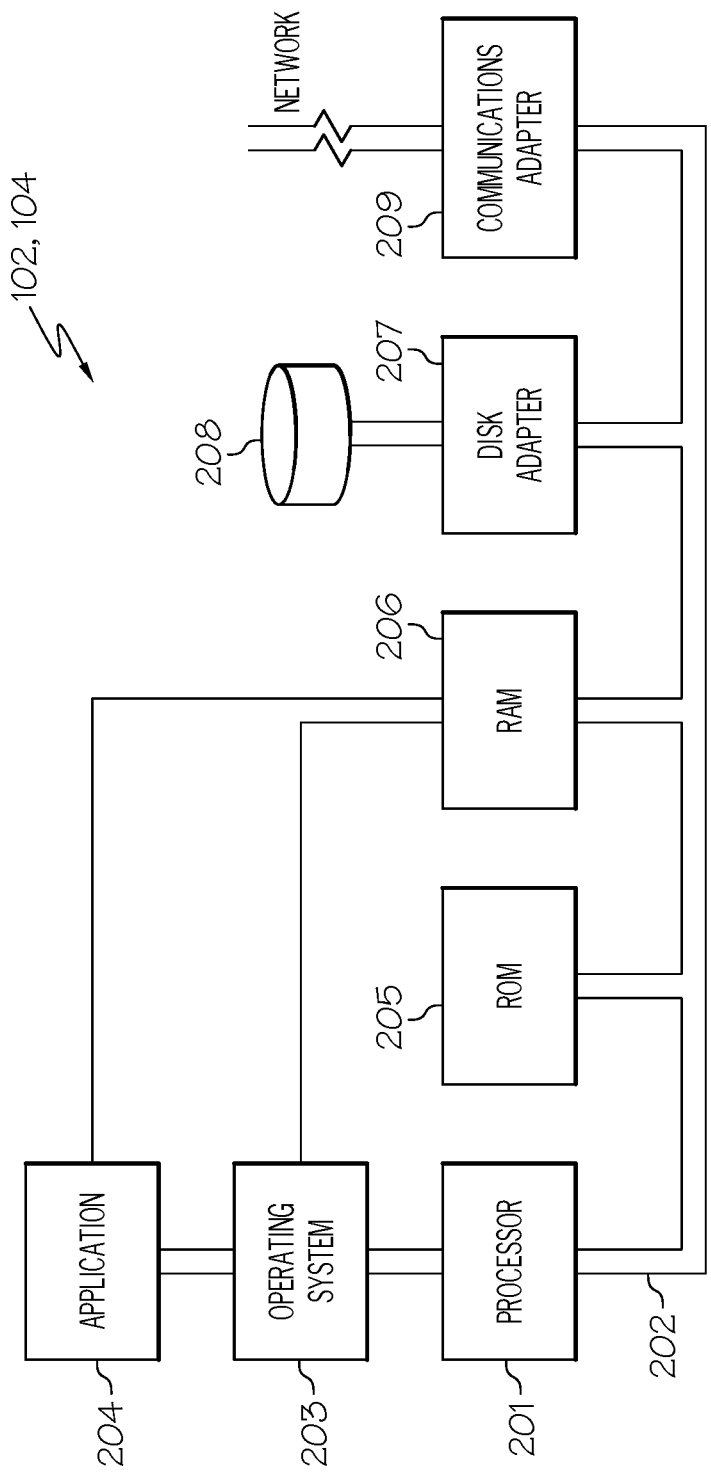
FIG. 2 illustrates a hardware configuration of a shared state server and a data grid server in accordance with an embodiment of the present invention.

Referring now to FIG. 2, FIG. 2 illustrates a hardware configuration of shared state server 102, data grid server 104 (FIG. 1) which is representative of a hardware environment for practicing the present invention. Shared state server 102, data grid server 104 has a processor 201 coupled to various other components by system bus 202. An operating system 203 runs on processor 201 and provides control and coordinates the functions of the various components of FIG. 2. An application 204 in accordance with the principles of the present invention runs in conjunction with operating system 203 and provides calls to operating system 203 where the calls implement the various functions or services to be performed by application 204. Application 204 of shared state server 102 may include, for example, a program for implementing synchronization of state information between instances of an application as well as between different applications in an efficient, scalable manner as discussed further below in association with FIGS. 4A-4B. Application 204 of data grid server 104 may include, for example, an in-memory cache and a routing table used for determining whether the requested state information is stored in the in-memory cache or in a partition outside of the in-memory cache as discussed further below in connection with FIG. 3 and FIGS. 4A-4B.

Referring again to FIG. 2, read-only memory ("ROM") 205 is coupled to system bus 202 and includes a basic input/output system ("BIOS") that controls certain basic functions of shared state server 102, data grid server 104. Random access memory ("RAM") 206 and disk adapter 207 are also coupled to system bus 202. It should be noted that software components including operating system 203 and application 204 may be loaded into RAM 206, which may be shared state server's 102, data grid server's 104 main memory for execution. Disk adapter 207 may be an integrated drive electronics ("IDE") adapter that communicates with a disk unit 208, e.g., disk drive. It is noted that the programs and applications of the present invention may reside in disk unit 208 or in application 204.

Shared state server 102, data grid server 104 may further include a communications adapter 209 coupled to bus 202.

Communications adapter 209 of shared state server 102, data grid server 104 interconnects bus 202 with an outside network (e.g., network 103 of FIG. 1) thereby enabling shared state server 102 to communicate with client 101 (FIG. 1) and data grid server 104 and enabling data grid server 104 to communicate with shared state server 102.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," 'module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the C programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the function/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the function/acts specified in the flowchart and/or block diagram block or blocks.

As stated in the Background section, as a result of having multiple instances of an application on multiple devices, the application state, such as application settings, for each of the instances of the application needs to be synchronized in order for the user to be provided with a seamless and consistent experience. That is, the application state, such as application settings, for each of the instances of the application needs to be synchronized in order for each application to perform consistently regardless of which device the user is using. For example, if the user configures a new e-mail account within an e-mail application on a laptop computer, then the new e-mail account should be reflected within the e-mail application on the user's desktop computer. As a result, the application state for each of the instances of the application needs to be synchronized. Currently, such instances of an application become synchronized by creating an interface with a remote service (e.g., web services, such as JAX-RS services) and have those instances periodically synchronize in order to maintain consistency. Unfortunately, such a synchronization process occurs at unpredictable times. Furthermore, such a synchronization process may have unpredictable results depending on which application instance is synchronized first.

Figure 3:
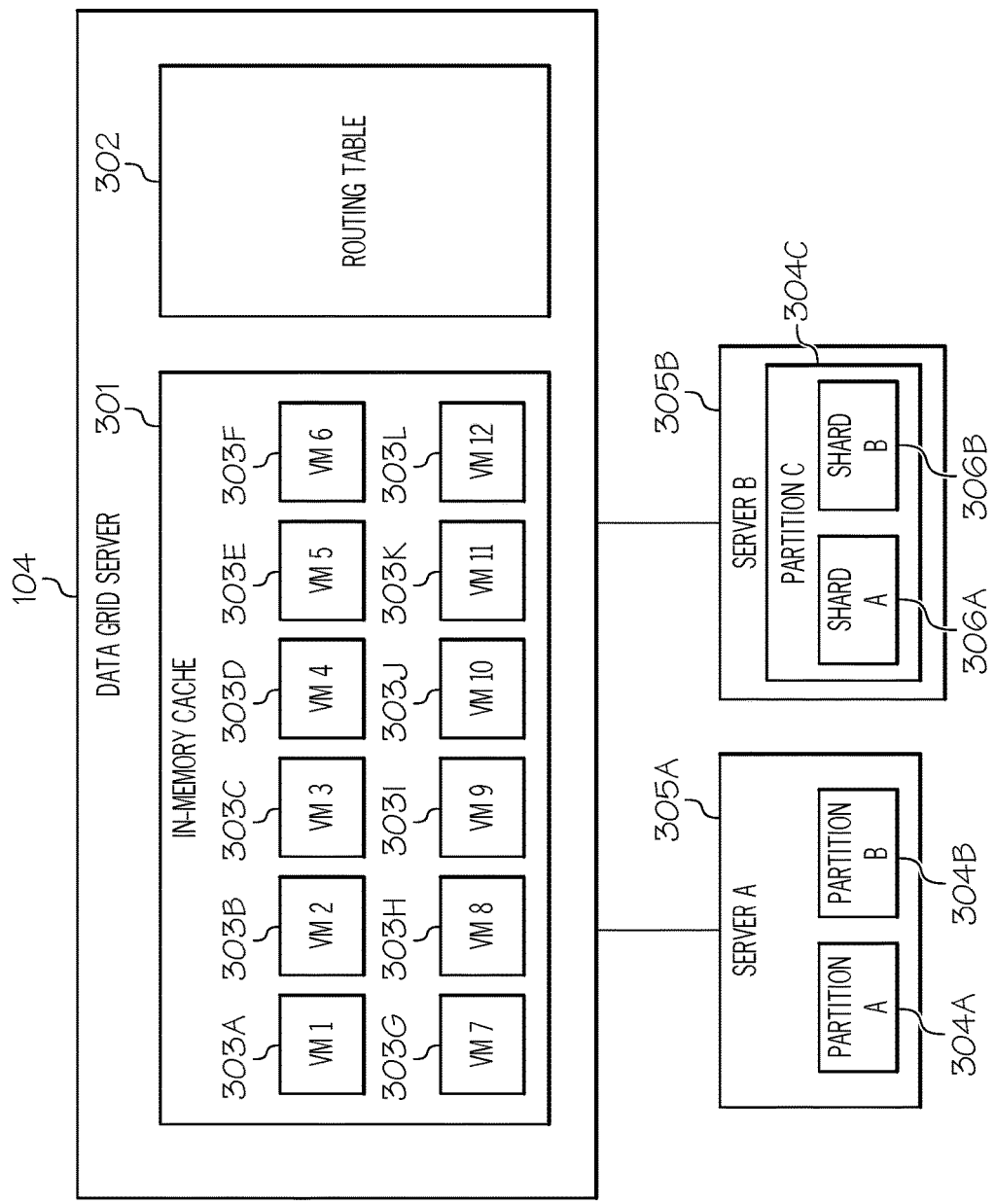
FIG. 3 illustrates the data grid server using a routing table for determining whether the requested state information is stored in the in-memory cache of the data grid server or outside of the in-memory cache in accordance with an embodiment of the present invention.
Figure 4A:
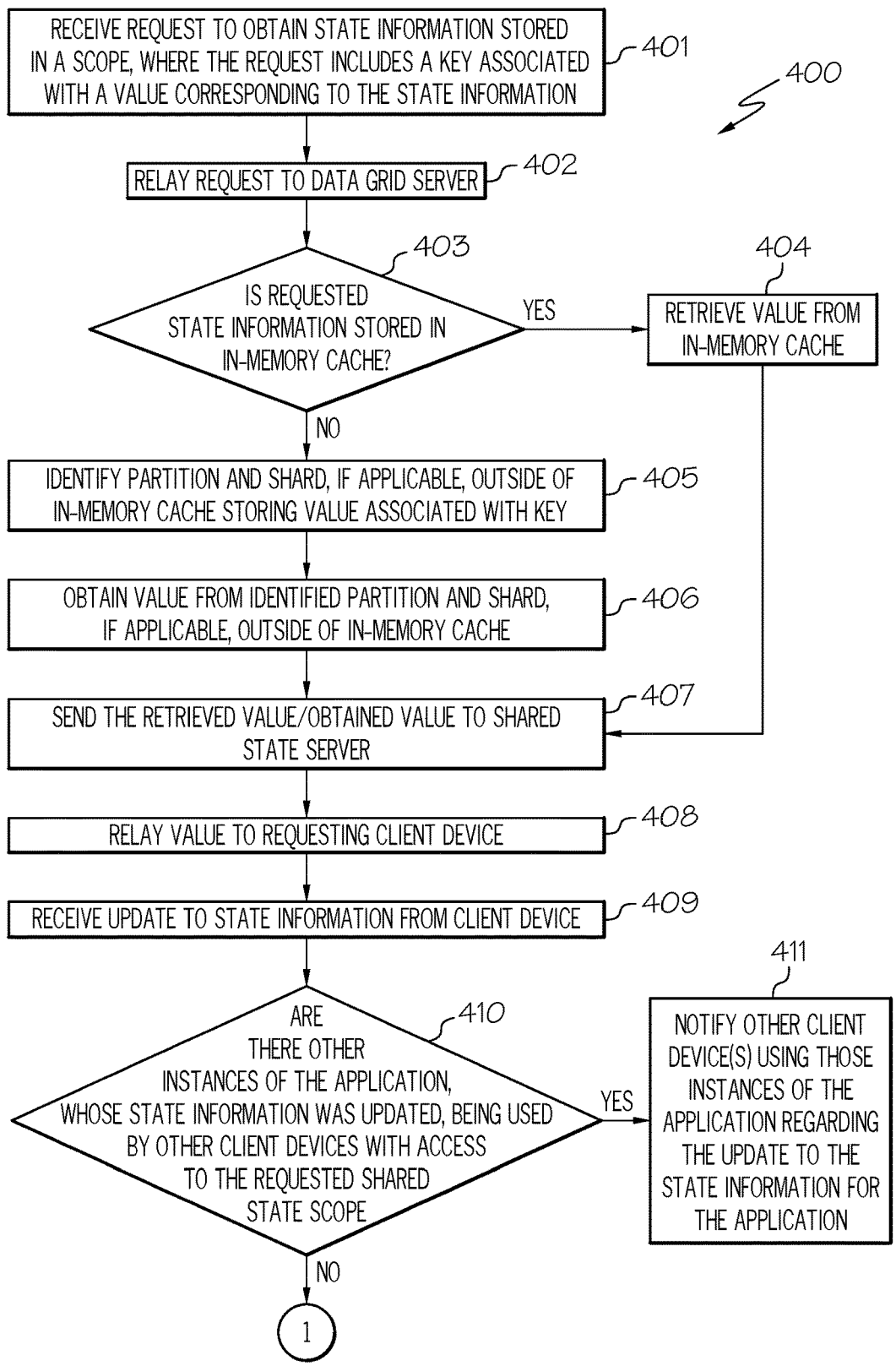
FIGS. 4A-4B are a flowchart of a method for implementing synchronization of state information between instances of an application as well as between different applications in an efficient, scalable manner in accordance with an embodiment of the present invention.
Figure 4B:
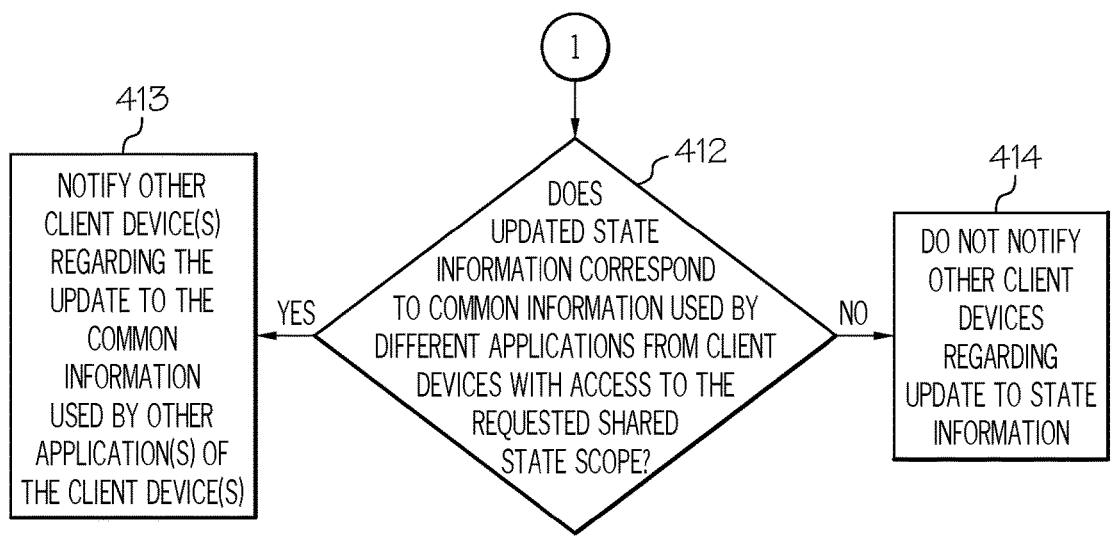

The principles of the present invention provide a means for synchronizing the state information of an application among multiple instances of the application without requiring periodic synchronization in an efficient, scalable manner as discussed further below in connection with FIGS. 3 and 4A-4B. Furthermore, the state information containing common information used by different applications can be synchronized among these applications without requiring periodic synchronization in an efficient, scalable manner as discussed further below in connection with FIGS. 3 and 4A-4B. FIG. 3 illustrates data grid server 104 (FIGS. 1 and 2) using a routing table for determining whether the requested state information is stored in the in-memory cache of data grid server 104 or outside of the in-memory cache. FIGS. 4A-4B are a flowchart of a method for implementing synchronization of state information between instances of an application as well as between different applications in an efficient, scalable manner.

As discussed above, FIG. 3 illustrates data grid server 104 (FIGS. 1 and 2) using a routing table for determining whether the requested state information is stored in the in-memory cache of data grid server 104 or in a partition outside of the in-memory cache in accordance with an embodiment of the present invention.

Referring to FIG. 3, in conjunction with FIGS. 1-2, data grid server 104 includes an in-memory cache 301 and a routing table 302. In one embodiment, in-memory cache 301 and routing table 302 are software components residing in application 204/disk unit 208. In one embodiment, in-memory cache 301 stores state information (e.g., user-wide state information, device-wide state information, application-specific state information) in a plurality of containers 303A-303L that may be run on separate computer resources. Containers 303A-303L may collectively or individually be referred to as containers 303 or container 303, respectively. In-memory cache 301 may include any number of containers 303 and FIG. 3 is not to be limited in scope to the depicted number of containers 303.

Containers 303 function as partitions that store portions of the data (state information) in in-memory cache 301. Combining the data stored by all of the containers 303 defines the total data stored by in-memory cache 301. In one embodiment, the memory address space associated with containers 303 is virtualized. That is, containers 303 may each map to a portion of the shared address space though they may be run by different computing systems.

The "in-memory data grid" is comprised of in-memory cache 301 and the partitions, and shards, if applicable, that may reside on separate physical machines as discussed below. In one embodiment, the in-memory data grid may use a hash function or key-value pairs to store data in containers 303 and in the partitions, and shards, if applicable, that may reside on separate physical machines. In one embodiment, routing table 302 stores the necessary information (e.g., a list of keys and the associated containers 303 of in-memory cache 301 or associated partitions outside of in-memory data cache 301 storing the values (i.e., the state information) associated with the keys) to determine if the state information requested from a client device 101 is stored within in-memory cache 301, and if so, which container 303 stores the requested state information. By having an in-memory cache 301 storing state information, the requested state information may be obtained quicker if the requested state information is stored within in-memory cache 301 (i.e., a cache hit). If, however, the requested state information is not stored within in-memory cache 301 (i.e., a cache miss), then data grid server 104 will obtain the requested state information from the partition and shard, if applicable, outside of in-memory cache 301 identified in routing table 302 as discussed in further detail below. For example, routing table 302 may store a list of keys and the associated partitions, and shards, if applicable, that store the value (i.e., the state information) associated with the key.

As discussed above, the state information is stored in multiple partitions or "shared state scopes" (also referred to as simply "scopes"). In one embodiment, each shared state scope is distributed over one or more partitions, which may or may not reside on different physical machines, thereby increasing scalability. For example, the state information in a scope may be distributed over "partition A" 304A and "partition B" 304B of server 305A (identified as "server A" in FIG. 3) and "partition C" 304C of server 305B (identified as "server B" in FIG. 3). Partitions 304A-304C may collectively or individually be referred to as partitions 304 or partition 304, respectively. Furthermore, servers 305A-305B may collectively or individually be referred to as servers 305 or server 305, respectively. While FIG. 3 illustrates three partitions 304 distributed over two servers 305, each scope may be distributed over any number of partitions 304 of any number of servers 305. Furthermore, a scope may be distributed over one or more partitions that may reside internally within data grid server 104 or externally to data grid server 104 (such as via server(s) 305) or a combination of residing internally within or externally to data grid server 104.

Furthermore, each partition 304 may be further partitioned into what is referred to herein as "shards" providing further scalability. For example, partition 304C of server 305B includes shard A 306A and shard B 306B. Shards 306A-306B may collectively or individually be referred to as shards 306 or shard 306, respectively. Each shard 306 may be representative of data stored on behalf of a company thereby providing multitenancy. For example, shard 306A may store state information on behalf of company A and shard 306B may store state information on behalf of company B. Each partition 304 may include any number of shards 306 and FIG. 3 is not to be limited in scope to the depicted number of partitions 304, servers 305 and shards 306. A further description of using these components in connection with synchronizing the state information of an application among multiple instances of the application without requiring periodic synchronization as well as synchronizing the state information containing common information among different applications that use the common information without requiring periodic synchronization is discussed further below in connection with FIGS. 4A-4B.

Referring again to FIG. 3, in one embodiment, in-memory cache 301 stores data objects in containers 303. That is, in-memory cache 301 may be an object-oriented database rather than a relational database. A data object is an instance of a class defined by an object-oriented programming language, such as Java® or C++. A data object may contain various attributes that are defined by the class.

Each container 303 in in-memory cache 301 may be a virtual machine (e.g., Java® Virtual Machine (JVM)) that stores one or more data objects as illustrated in FIG. 3 (e.g., containers 303A-303L are identified as "VM1-VM12," respectively, in FIG. 3, where "VM" refers to a virtual machine). In one embodiment, in-memory cache 301 may be expanded by increasing the number of virtual machines 303 and redistributing the data amongst them.

Referring now to FIGS. 4A-4B, FIGS. 4A-4B are a flowchart of a method 400 for implementing synchronization of state information between instances of an application as well as between different applications in an efficient, scalable manner in accordance with an embodiment of the present invention.

Referring to FIG. 4A, in conjunction with FIGS. 1-3, in step 401, shared state server 102 receives a request from client device 101 (e.g., client device 101A) to obtain state information stored in a shared state scope, where the scope is distributed over one or more partitions 304, which may or may not reside on different physical machines, thereby increasing scalability. In one embodiment, the request includes a key associated with a value corresponding to the requested state information. Furthermore, in one embodiment, the key is prefixed with a company namespace thereby allowing multitenancy to be achieved as discussed in further detail below.

In step 402, shared state server 102 relays the received request from client device 101 to data grid server 104. As stated above, the request includes a key associated with a value corresponding to the requested state information. For example, each key may be associated with a container 303 or partition 304 (e.g., partition 304A of server 305A) that stores the value associated with the key. Such information is stored in routing table 302 which is used by data grid server 104 to determine the location of the requested state information.

In step 403, a determination is made by data grid server 104 as to whether the requested state information is stored in in-memory cache 301. For example, routing table 302 may be used by data grid server 104 to determine if the key provided in the request of step 401 is associated with a container 303 of in-memory cache 301 or associated with a partition 304 outside of in-memory cache 301.

If the requested state information is stored in in-memory cache 301 (i.e., a cache hit), then, in step 404, data grid server 104 retrieves the value (i.e., the state information) stored in the container 303 of in-memory cache 301 that is associated with the key provided in the request of step 401. That is, if the key provided in the request of step 401 is associated with a container 303 of in-memory cache 301, then, in step 404, data grid server 104 retrieves the value (i.e., the state information) stored in the container 303 of in-memory cache 301 that is associated with the key.

If, however, the requested state information is not stored in in-memory cache 301 (i.e., a cache miss), then, in step 405, data grid server 104 identifies the partition 304 and shard 306, if applicable, storing the value associated the key provided in the request of step 401. In one embodiment, the partition 304 and shard 306, if applicable, is identified using routing table 302.

In step 406, data grid server 104 obtains the value from the identified partition 304 and shard 306, if applicable, storing the value associated the key provided in the request of step 401. For example, referring to FIG. 3, if client device 101A requests the value of the key "com.companyA.UserName" where the key is prefixed with the company namespace "com.companyA," then data grid server 104 determines if the key is associated with a container 303 in in-memory cache 301 using routing table 302. If routing table 302 indicates that the key is not associated with a container 303 in in-memory cache 301, but instead, is associated with a partition 304, such as partition 304C of server 305B, which has two shards 306, then data grid server 104 may determine which shard 306 of partition 304C is associated with the company namespace ("company A") prefixed to the key. For example, if shard 306A stores state information on behalf of company A, then data grid server 104 obtains the value from shard 306A. In this manner, the state information can be stored in a scalable manner, including achieving multitenancy, thereby improving the efficiency in synchronizing state information, where synchronization of the state information will be discussed in further detail below.

Upon retrieving the value stored in container 303 of in-memory cache 301 or upon obtaining the value from partition 304 and shard 306, if applicable, data grid server 104, in step 407, sends the retrieved value/obtained value to shared state server 102.

In step 408, shared state server 102 relays the retrieved value/obtained value to the requesting client device 101 (e.g., client device 101A).

In step 409, shared state server 102 receives an update to the state information by the requesting client device 101. For example, once client device 101 obtains the state information stored in the requested shared state scope, client device 101 may perform various operations on the state information. For example, if the user of client device 101 configures a new e-mail account within an e-mail application, then the state information directed to application settings is modified/updated to reflect the new e-mail account. Client device 101 may immediately send the update to the state information to shared state server 102 or after a period of time, such as in the case where the shared state scope is defined as only being accessible by one client device 101 at a time. In such a scenario (where the shared state scope is defined as only being accessible by one client device 101 at a time), client device 101 may simply send all of its updates to shared state server 102 at one particular time.

In step 410, a determination is made by shared state server 102 as to whether there are other instances of the application, whose state information was updated, being used by other client devices 101 with access to the requested shared state scope.

If there are other instances of the application, whose state information was updated, being used by other client devices 101 with access to the requested shared state scope, then, in step 411, server 102 notifies those client device(s) 101 with access to the requested shared state scope regarding the update to the state information for the application.

Referring now to FIG. 4B, in conjunction with FIGS. 1-3, if, however, there are no other instances of the application, whose state information was updated, being used by other client devices 101 with access to the requested shared state scope, then, in step 412, a determination is made by shared state server 102 as to whether the updated state information corresponds to common information (e.g., user information) used by different applications from client devices 101 with access to the requested shared state scope. That is, in step 412, a determination is made by shared state server 102 as to whether the updated state information corresponds to common information (e.g., user information) that is shared among different applications.

If the updated state information corresponds to common information that is shared among different applications from client devices 101 with access to the requested shared state scope, then, in step 413, server 102 notifies other client device(s) 101 with access to the requested shared state scope regarding the update to the common information used by other application(s) of the notified client device(s) 101.

If, however, the updated state information does not correspond to common information that is shared among different applications from client devices 101 with access to the requested shared state scope, then, in step 414, shared state server 102 does not notify other client devices 101 regarding such an update to the state information.

In some implementations, method 400 may include other and/or additional steps that, for clarity, are not depicted. Further, in some implementations, method 400 may be executed in a different order presented and that the order presented in the discussion of FIGS. 4A-4B is illustrative.

Additionally, in some implementations, certain steps in method 400 may be executed in a substantially simultaneous manner or may be omitted.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for implementing synchronization of state information in an efficient, scalable manner, the method comprising:
   receiving from a client device an update to state information of an application stored in a scope, wherein said scope is distributed over one or more partitions;
   determining whether other instances of said application whose state information was updated is being used by other client devices with access to said scope; and
   notifying a first set of one or more client devices with access to said scope regarding said update to said state information of said application in response to determining that one or more other instances of said application are being used by said first set of one or more client devices.

2. The method as recited in claim 1 further comprising:
   determining whether said updated state information corresponds to common information used by different applications from said other client devices with access to said scope in response to determining that there are no other instances of said application whose state information was updated being used by said other client devices with access to said scope.

3. The method as recited in claim 2 further comprising:
   notifying a second set of one or more client devices with access to said scope regarding said update to said common information in response to determining that said updated state information corresponds to said common information that is shared among one or more different applications from said second set of one or more client devices with access to said scope.

4. The method as recited in claim 3, wherein said first set of one or more client devices corresponds to different client devices than said second set of one or more client devices.

5. The method as recited in claim 3, wherein said first set of one or more client devices corresponds to the same client devices as said second set of one or more client devices.

* * * * *